UNITED STATES PATENT OFFICE 1,965,273

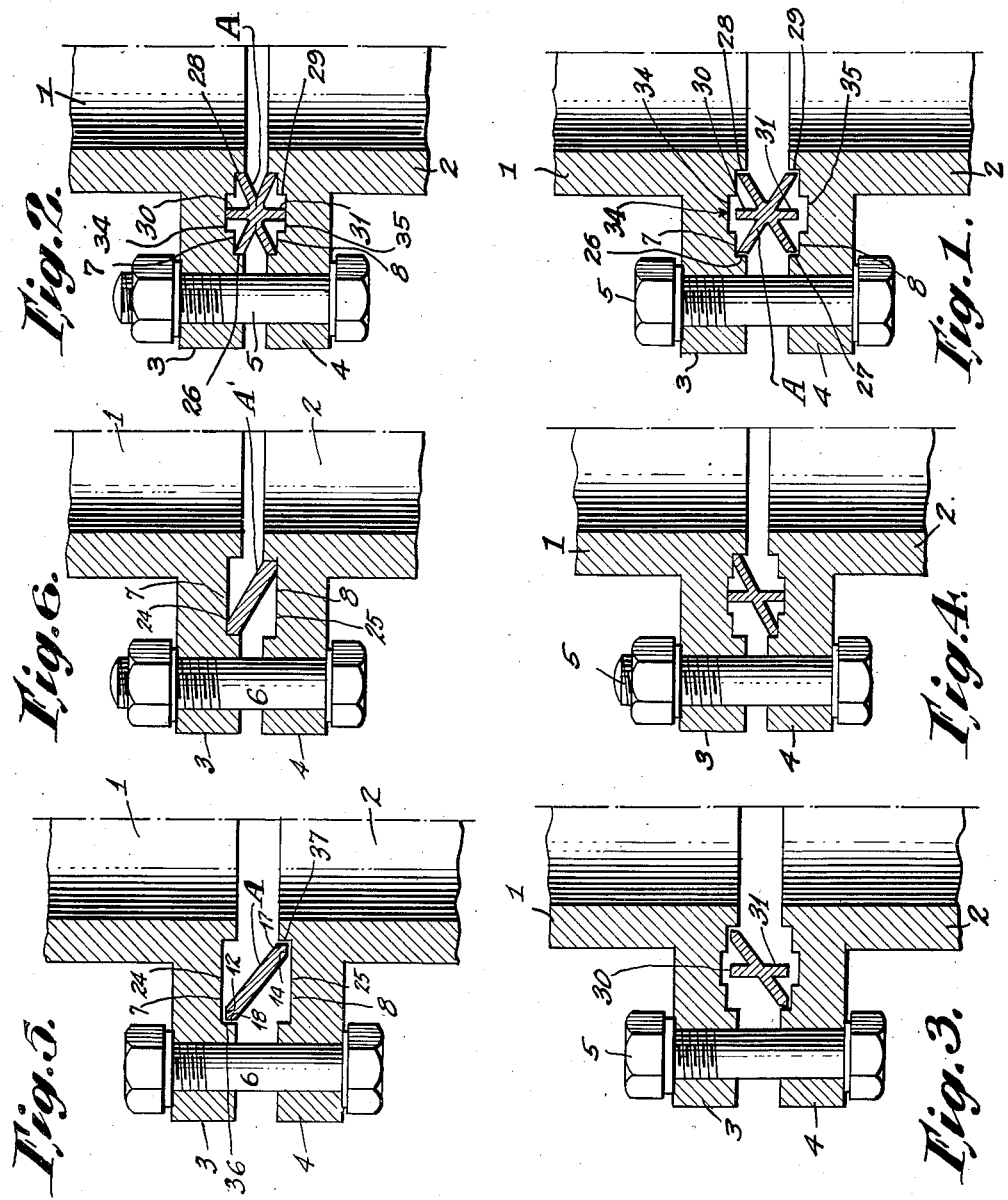

SEALING AND LOCKING DEVICE

Wylie G. Wilson, Elizabeth, N. J., assignor to Wilson Rings Company, Jersey City, N. J., a corporation of Delaware Application April 24, 1926, Serial No. 104,444
Renewed February 12, 1931

12 Claims. (Cl. 285—139)

The primary object of the present invention is to provide a gasket for making tight joints for holding high pressure fluids.

Another object of the invention is to provide a gasket which can be inserted between flanges that are machined in a duplicate manner and therefore are interchangeable.

Another object of the invention is to provide a gasket for high pressure and/or high temperature work which can be used with flanges that do not have accurately finished surfaces so as to give a tight joint even with inequalities in the flange faces and without placing undue strain on the flanges and bolts.

Another object of the invention is to provide a type of gasket that will result in a pressure being exerted against the flange faces greater than the sum of the tensions of the flange bolts which draw the flanges together.

Another object of the invention is to provide a gasket that can be applied to all ordinary types of flanges with the least amount of work on such flanges and with a minimum weakening of standard forms of flanges.

One of the difficulties involved in the operation of such devices is found in the fact that it is important for example, with a conical or frusto conical element or gasket that it shall be maintained in an elastic condition, both for the purpose of accomplishing and maintaining a seal, and also for the purpose of causing gasket or element to inherently react when relieved of such pressure.

A further object of this invention is to so construct the gasket and the means of axially compressing the same as to limit the degree of pressure exercised on the element, to prevent an excess of pressure or strain on the gasket such as to cause the conical or frusto-conical gasket to collapse and thus destroy the elasticity and resilience which is one of the meritorious features of such an assembly of devices.

A hollow cone or a frusto cone, i. e., a member having a hollow conical section, when interposed between suitable abutments and compressed axially yields to such pressure and so long as said axial pressure is within the elastic limit of the cone or frusto cone, the elasticity of the gasket or element will be retained, but when the axial pressure exerted on the cone or frusto cone is sufficiently great, the cone or frusto cone will collapse, and this collapse will destroy its efficiency for the purpose for which it is intended in the assembly above described.

It is desirable in many cases, therefore to provide means by which the elastic limit of the cone or frusto-cone may be determined, and the compression means may be subject to control to the extent that such compression means will be positively limited in its axial thrust, in such a way as to make it impossible for such compression means to operate beyond said predetermined limitation characterized as the elastic limit incident to the operation of said cone or frusto cone.

The results last above referred to may be accomplished in any convenient way. As a matter of illustration in this application for patent, it is proposed that a strut may be formed if desired integrally with the cone or frusto cone in such a way as to cause the strut to be interposed positively between the moving elements in such a way that such pressure cannot exceed the degree of pressure incident to the compression of said cone or frusto cone within its said elastic limit.

It will be understood, of course, that such means for restricting the limitation of the said pressure as exercised may be accomplished in any other convenient manner.

Also, the provision of a positive compression limiting means while desirable in some cases, as explained, is not essential, and a simple ring form of gasket that does not include such a compression limiting portion may be efficiently employed.

The accompanying drawing illustrates different practical embodiments of the invention, but the construction therein shown is to be understood as illustrative, only, and not as defining the limits of the invention.

Figure 1 shows a gasket or sealing element embodying the present invention in radial section interposed between flanges of adjacent pipe ends, the flanges being also shown in radial section and the parts being illustrated in loosened condition.

Figure 2 shows the same arrangement of parts as illustrated in Figure 1 but with the flanges drawn toward one another to place the gasket or sealing element under axial compression to produce a tight seal.

Figures 3 and 4 correspond to Figures 1 and 2, but illustrate a modified form of sealing element or gasket.

Figures 5 and 6 are similar to Figures 1 and 2, but show a single form of gasket or element that does not include the compression limiting portion shown in the other figures.

Referring to the drawing, 1 and 2 designate two adjacent pipe ends which are respectively provided with flanges 3 and 4. The flanges are perforated to receive a plurality of bolts 5, whereby the pipe ends may be drawn together. In the adjacent faces of the respective flanges are formed axial abutments 7 and 8 and coaxial abutments 26, 28, 27 and 29, respectively. Between these abutments is positioned a gasket or sealing element A embodying my invention. This sealing element or gasket, which may be termed the sealing ring, embodies two hollow frusto-conical sections intersecting one another, so as to produce a ring of composite hollow frusto conical shape or cruciform cross section. This general form is well known and according to the present invention, the ring is made of such metal that it has the characteristic of resiliently yielding when axially compressed within its elastic limit and inherently reacting when such compression is relieved.

In accordance with the present invention, there is associated with this ring gasket, either as an integral part thereof or so associated therewith as to coact with the ring, means which will limit the axial compression which may be imposed upon the conical sections to a degree within the elastic limit of the ring. For the purpose of illustration, I have shown this means as formed integral with the ring and comprising two stop members 30 and 31. These stop members which are formed integral with the ring extend entirely about the ring and form upwardly and downwardly extending annular walls which collectively constitute an annular strut, disposed in parallel relation to any axial compression which may be applied to the ring by the bolts 5 or any other means, which will serve to force the abutments 7 and 8 toward one another.

A sealing ring of the character described may be introduced into the position as shown in Figure 1, so as to fit loosely between the abutments, but when the bolts 5 are tightened, axial compression will be imparted to the ring for the purpose of decreasing the inner circumference of each conical section of the ring and increasing the outer circumference of each conical section in order to produce a tight joint between the ring and the several abutments of the two flanges. In the showing of Figures 1 and 2, the strut is shown of a length substantially equal to the height of the ring and to permit of sufficient compression of the ring to produce a tight seal, the abutments 7 and 8 are cut away to provide recesses, the bases of which constitute additional abutments 34 and 35 to be engaged by the upper and lower edges of the strut, after the ring has been compressed sufficiently to produce a tight seal but before it has been compressed beyond its elastic limit. The arrangement of the parts is carefully calculated in practice so as to give this result.

I have shown in Figures 1 and 2 recesses so as to permit the strut to be made the same height as the ring, but, in practice, the strut may be made of lesser height and coact directly with the abutments 7 and 8.

It will be apparent, however, that in either instance, the presence of the strut will positively preclude the stressing of the sealing element beyond its elastic limit since when such strut is engaged by the coacting abutments, it will thereafter take the force applied by the bolts 5 as a direct thrust and further stressing of the element will be precluded. When a joint is made in this manner, the cruciform ring will be retained in stressed condition so long as the compressive force continues, but as soon as this force is relieved, as by loosening the bolts 5, the gasket or element will inherently react to reassume substantially its original form wherein it will be loose between the abutments and can be readily removed.

The same general arrangement which I have described with reference to Figures 1 and 2 is present in the structure of Figs. 3 and 4, except that the gasket or sealing element is formed with a single conical section instead of being of cruciform cross section as in the preceding figures.

As stated above, the provision of positive compression limiting means is not essential and I have shown in Figures 5 and 6 a simple ring devoid of such means.

Referring to Figures 5 and 6, the construction illustrated includes the pipe sections 1 and 2 having integral flanges 3 and 4 adapted to be clamped together by bolts, only one of which (6) is shown, and the respective flanges are provided with recesses 7 and 8 forming abutments 24 and 25, so that the construction as thus far described is to all intents and purposes the same as shown in Figures 1 and 2.

It will be noted, however, that in Figures 5 and 6, a different form of sealing ring, i. e., one having no pressure limiting means, is employed from that shown in Figures 1 and 2. As a matter of fact, Figures 1 and 2 show a ring of composite frusto-conical section, whereas Figures 5 and 6 show a ring of simple frusto-conical section. In other words, the ring A' shown in these figures embodies only a single frustum of a hollow cone and this single frustum corresponds in all respects to the frustum shown in Figure 1. Moreover, it behaves in the same manner as the frustum of Figure 1 when placed under axial compression. Thus, if the parts are in the loosened condition shown in Figure 5, the tightening of the bolts 6 will cause the cavity or space formed by the recesses 7 and 8 to be vertically decreased, so that the abutments 24 and 25 will engage with the upper and lower surfaces 12 and 14, respectively, of the ring and will place the ring under axial compression.

As the compression is increased, the ring will be stressed to expand its outer peripheral edge 18 into engagement with the surface 36 and to simultaneously contract its inner periphery 17 into engagement with the surface 37 for the purpose of producing an impervious seal. The sealing condition of the parts is clearly shown in Figure 6.

The foregoing detailed description sets forth the invention in its preferred practical form, but the invention is to be understood as fully commensurate with the appended claims.

Having thus fully described the invention, what I claim as new and desire to secure by Letters Patent is:

1. In an assembly of the character described, an element embodying a hollow conical section formed from metal and having the characteristic of resiliently yielding when axially compressed within its elastic limit and inherently reacting when such compression is relieved, means for placing the element of conical section under axial compression and for relieving it therefrom, and means to positively preclude such compression of said element of conical section beyond its elastic limit, whereby it will inherently react when such compression is relieved.

2. In an assembly of the character described, an element embodying a hollow conical section formed from metal and having the characteristic of resiliently yielding when axially compressed within its elastic limit and inherently reacting when such compression is relieved, means for placing the element of conical section under axial compression and for relieving it therefrom, and means, carried by said element, to positively preclude such compression of said element of conical section beyond its elastic limit, whereby it will inherently react when such compression is relieved.

3. In an assembly of the character described, a pair of members arranged end to end in coaxial relation and having opposed coaxial abutments, and a metal element embodying a hollow conical section coaxially interposed between said abutments and having the characteristic of resiliently yielding when axially compressed within its elastic limit and inherently reacting when such compression is relieved, means for forcing said members in an axial direction toward one another to place the element of conical section under axial compression and for relieving such compression, and means to positively preclude such compression of the said element of conical section beyond its elastic limit whereby it will inherently react when such compression is relieved.

4. In an assembly of the character described, a pair of members arranged end to end in coaxial relation and having opposed coaxial abutments, and a metal element embodying a hollow conical section coaxially interposed between said abutments and having the characteristic of resiliently yielding when axially compressed within its elastic limit and inherently reacting when such compression is relieved, means for forcing said members in an axial direction toward one another to place the element of conical section under axial compression and for relieving such compression, and means, carried by said element, to positively preclude such compression of the said element of conical section beyond its elastic limit whereby it will inherently react when such compression is relieved.

5. In an assembly of the character described, a pair of members arranged end to end in coaxial relation and having at their contiguous faces seats comprising coaxial cylindrical abutments and opposed cross axial abutments, a metal element embodying a hollow conical section coaxially interposed between said abutments and having the characteristic of resiliently yielding when axially compressed within its elastic limit and inherently reacting when such compression is relieved, means for forcing said members in an axial direction toward one another to place said element under axial compression for the purpose of stressing the element into seated relation with respect to the coaxial cylindrical abutments of said members, said means being also operable to relieve such compression, and a coaxial cylindrical strut integral with said element and of sufficient length that the cross axial ends of said strut will engage with the cross axial abutments of said members when said cross axial abutments have been forced to a predetermined minimum distance apart for the purpose of precluding the compression force from stressing the conical section of said element beyond its elastic limit, whereby said element will inherently react when said compression force is relieved.

6. A sealing or locking element comprising a metal ring of cruciform cross section having the characteristic of resiliently yielding when axially compressed within its elastic limit and inherently reacting when said compression is relieved, and a coaxial cylindrical strut positioned substantially medial of the ring and proportioned to arrest axial compression of the cruciform cross section of the ring before said section has been stressed beyond its elastic limit.

7. A pipe joint comprising connecting members having opposing faces, circular shallow grooves having substantially the same dimensions and being similarly arranged in the faces, an annular gasket having its body portion formed to make an acute angle with one face and extending from the outside shoulder of the groove on one face to the inside shoulder of the groove on the opposing face said outside edge having a considerably greater diameter than said inside edge, and means for drawing the faces toward one another.

8. A pipe joint comprising connecting members having opposing faces, circular shallow shoulders arranged in the faces, the shoulders being opposed and of unequal diameters, an annular gasket arranged to extend obliquely to the faces and having its edges in engagement with the opposing shoulders, and means for drawing the faces toward one another.

9. A pipe joint comprising connecting members having circular shallow shoulders formed in their faces, the shoulders being opposed and of unequal diameters, a frusto-conical ring gasket mounted between the faces and having its edges in engagement with the opposing shoulders and means for drawing the faces toward one another.

10. A pipe joint comprising connecting members having opposing faces, circular shallow shoulders arranged in the faces, means to draw the members toward one another, and a metal gasket having its edges in engagement with the shoulders of the opposing faces and so arranged that it will be forced against the shoulders with greater pressure than the total tension exerted in drawing the faces together.

11. A joint comprising connecting members having opposing faces, circular shallow shoulders arranged in the faces, the shoulders being opposed and of unequal diameters, an annular gasket arranged to extend obliquely to the faces and having its edges in engagement with the opposing shoulders, means for drawing the faces toward one another, and means to limit the approaching movement of the faces.

12. A fluid-tight joint, comprising two opposing members, a frusto-conical ring gasket between said members, a shoulder on each member against which an edge of the gasket abuts, and means for forcing the said members toward each other to thereby force the gasket firmly against said shoulders.

WYLIE G. WILSON.